(12) United States Patent
Winn

(10) Patent No.: US 7,371,134 B2
(45) Date of Patent: May 13, 2008

(54) MOTOR MOUNT FOR AZIMUTHING POD

(75) Inventor: Peter M. Winn, Shrewsbury, MA (US)

(73) Assignee: American Superconductor Corporation, Devens, MA (US)

( * ) Notice: Subject to any disclaimer, the term of this patent is extended or adjusted under 35 U.S.C. 154(b) by 160 days.

(21) Appl. No.: 11/060,849

(22) Filed: Feb. 18, 2005

(65) Prior Publication Data

US 2006/0189223 A1   Aug. 24, 2006

(51) Int. Cl.
   *B60L 11/00*   (2006.01)
(52) U.S. Cl. .................................................. 440/6
(58) Field of Classification Search .................... 440/6
   See application file for complete search history.

(56) References Cited

U.S. PATENT DOCUMENTS

| | | | |
|---|---|---|---|
| 6,347,522 B1 | 2/2002 | Maguire et al. | |
| 6,376,943 B1 | 4/2002 | Gamble et al. | |
| 6,489,701 B1 | 12/2002 | Gamble et al. | |
| 6,685,516 B2 | 2/2004 | Tsuboguchi | |
| 7,018,249 B2 | 3/2006 | Ries | |
| 7,061,147 B2 * | 6/2006 | Ries ............................. | 310/54 |

FOREIGN PATENT DOCUMENTS

| WO | WO 02/24523 | 3/2002 |
|---|---|---|
| WO | WO 03/047961 | 6/2003 |

OTHER PUBLICATIONS

Kalsi et al., "Development Status of Rotating Machines Employing Superconducting Field Windings", Proceedings of IEEE, vol. 92, No. 10, Oct. 2004.

* cited by examiner

*Primary Examiner*—Jesús D Sotelo
(74) *Attorney, Agent, or Firm*—Occhiuti Rohlicek & Tsao LLP

(57) ABSTRACT

A system includes an azimuthing pod configured to be attached to the hull of a ship, a superconducting motor positioned within the azimuthing pod, a refrigeration system including a compressor and a cryogenic refrigeration module coupled to the compressor. The system further comprises a transfer system configured to circulate a coolant between the cryogenic refrigeration module and the superconducting machine, at least one of the compressor and the cryogenic refrigeration module being positioned within the hull of the ship.

10 Claims, 6 Drawing Sheets

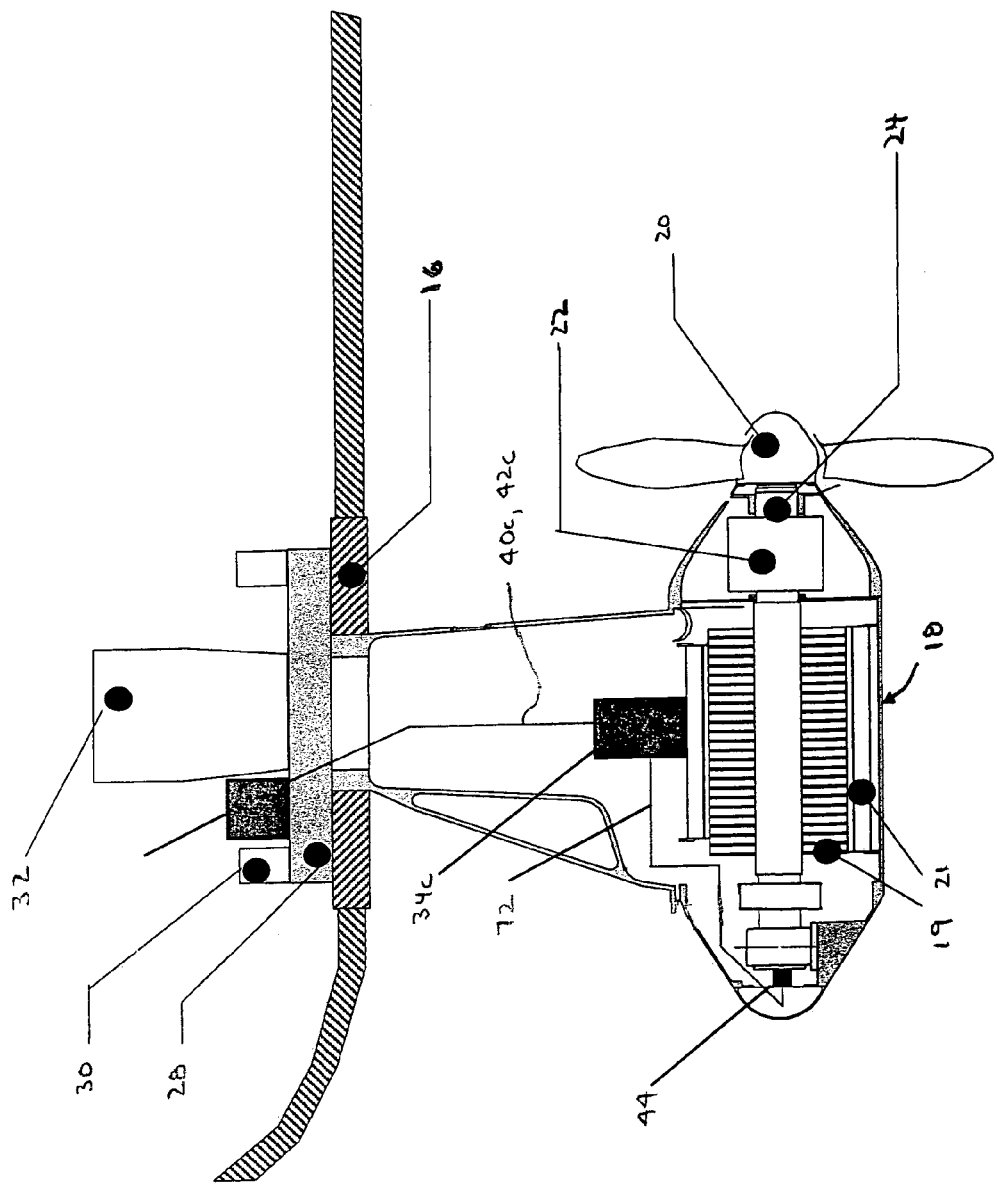

MOTOR MOUNT FOR AZIMUTHING POD

BACKGROUND

Large shipping vessels including cruise ships, naval vessels and tankers are often propelled with pod propulsion systems. Such systems generally include an electric motor enclosed within a hydrodynamically optimized body, which can be rotated through 360 degrees to provide the required thrust in any direction. These systems, often called azimuthing pods eliminate the need for stem tunnel thrusters and maximize maneuverability. Thus, even large vessels with azimuthing pods can maneuver into relatively small ports without the need for tug assistance. Azimuthing pods also save space, are more easily installed and are efficient, relative to conventional stem thrusters. 360° azimuthing propulsion can provide power at levels as high as 30 megawatts.

SUMMARY

In a general aspect of the invention, a system comprises an azimuthing pod configured to be attached to the hull of a ship, a superconducting motor positioned within the azimuthing pod, a refrigeration system including a compressor and a cryogenic refrigeration module coupled to the compressor. The system further comprises a transfer system configured to circulate a coolant between the cryogenic refrigeration module and the superconducting machine, at least one of the compressor and the cryogenic refrigeration module being positioned within the hull of the ship.

Embodiments of this aspect of the invention may include one or more of the following features.

The system includes a rotatable support member configured to interface a stationary reference frame in the hull to a rotating reference frame in the azimuthing pod. The transfer system includes transfer lines extending through the rotatable support member and between the module and superconducting motor. The transfer lines extend through a center axis of the rotatable support member.

The position of the compressor and module relative to the pod can vary depending upon the available space on the rotatable support member as well as within the pod. For example, n certain embodiments, both the compressor and module are positioned within the hull, while in others the module is positioned in the pod.

In some embodiments, neither the compressor nor the module is on the rotatable support member, while in other embodiments, the module is on the rotatable support member while the compressor is not on the rotatable support member, while still in other embodiments, both the compressor and the module are on the rotatable support member.

The rotatable support member is configured to rotate 360°. The coolant circulated by the transfer system is selected from a group consisting of helium, hydrogen, oxygen, nitrogen, argon, neon, and mixtures thereof. The superconducting motor includes high temperature superconducting windings.

In another aspect of the invention, a system comprises a superconducting machine disposed in a rotatable reference frame; a refrigeration system including a compressor and a cryogenic refrigeration module coupled to the compressor; and a transfer system configured to circulate a coolant between the cryogenic refrigeration module and the superconducting machine, at least one of the compressor and the cryogenic refrigeration module being positioned in a stationary reference frame.

In certain embodiments, the system can include a housing in the rotatable reference frame for enclosing the superconducting machine. The rotatable reference frame has an axis about which the superconducting machine rotates and the superconducting machine includes a rotor assembly which, in operation, rotates about an axis of the superconducting machine that is substantially perpendicular to the axis of the rotatable reference frame. The rotatable reference frame is configured to rotate without limit around an axis of rotation.

Among other advantages, the systems described above offer the possibility of a smaller, more efficient pod propulsion system for use, in particular, with large shipping vessels. A superconducting motor is generally smaller than its non-superconducting motor for a given output power rating. Thus, the overall volume of the pod for enclosing the motor can be smaller. However, unlike it's non-superconducting counterpart, a superconducting motor requires a system for cryogenically cooling the superconducting components (e.g., windings) of the motor. Positioning the cryogenic cooling system in the pod eliminates the reduced size advantage of the superconducting motor. However, the reduced size advantage can be maintained by positioning the cooling system external to the pod (e.g., within the hull). That said, because the pod rotates, the cooling must be provided in a manner that does not interfere with other mechanical systems (e.g., lubrication systems) needed for the motor. The systems described above provide various configurations in which cooling can be provided to the superconducting motor, while maintaining the overall size advantages associated with using a superconducting motor.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a still another embodiment of an azimuthing pod including a cryogenic cooling system.

DETAILED DESCRIPTION

Figure 1:
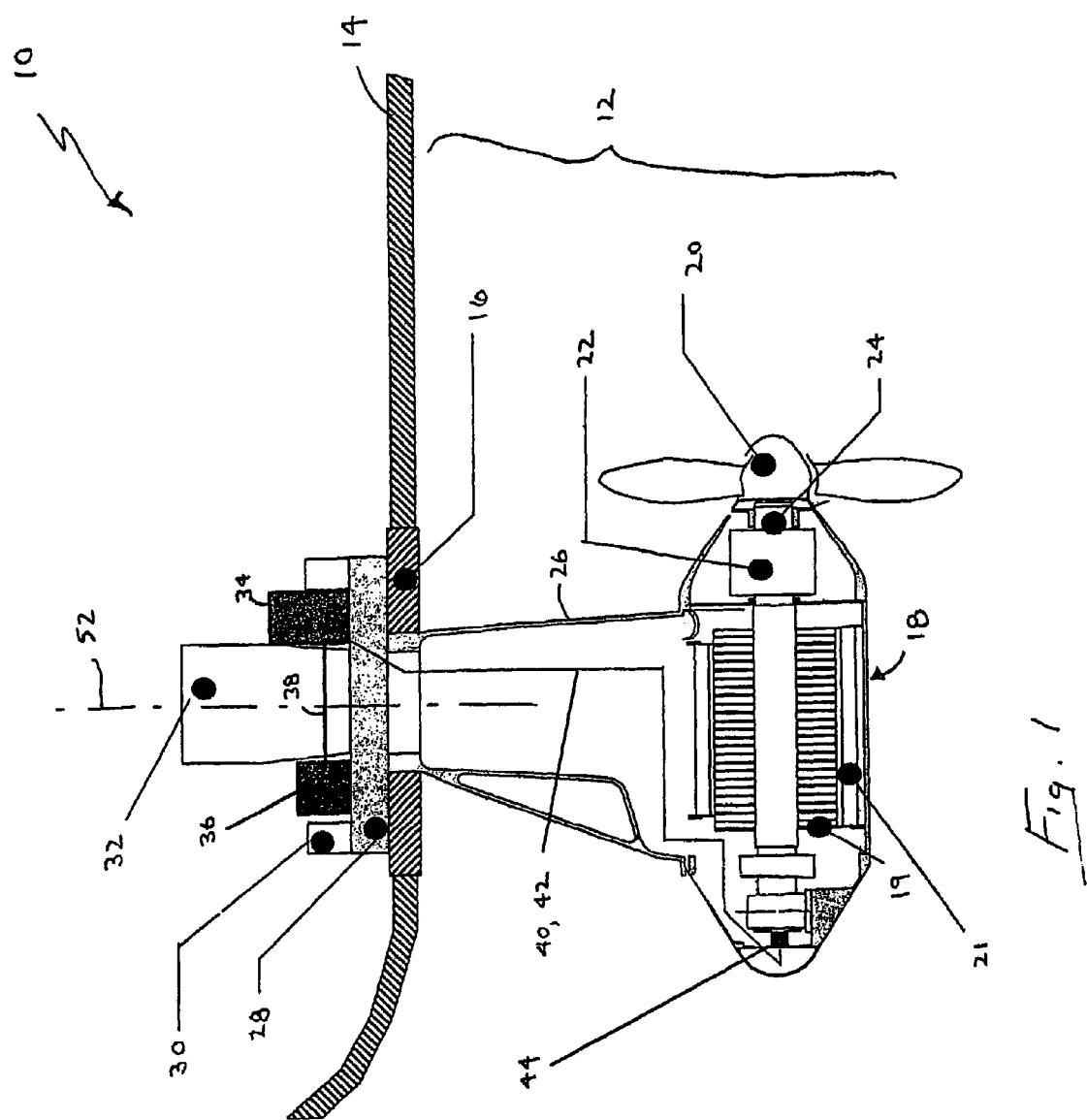
FIG. 1 is a cross-sectional side view schematic representation of an azimuthing pod including a cryogenic cooling system.

Referring to FIG. 1, a pod propulsion system 10 includes an azimuthing pod 12 attached to the hull 14 of a ship through a pod seating 16. Azimuthing pod 12 includes a superconducting electric motor 18 which drives a propeller 20 through a thrust bearing mechanism 22 and sealing system 24. The electric motor 18, thrust bearing mechanism 22 and sealing system 24 are enclosed within an outer shell 26 of the azimuthing pod 12.

Positioned within the hull 14 and upon the pod seating 16 is a turntable assembly 28 which supports, among other components, a steering system 30 and a power transmission/control system 32 for rotating and steering the azimuthing pod 12. Steering system 30 and transmission/control system 32 allow azimuthing pod to spin continuously and without limit about an axis of rotation 52.

Superconducting electric motor 18 includes a rotor assembly 19 surrounded by a stator assembly 21 and having a number high temperature superconductive (HTS) windings (not shown) mounted, for example in a multi-pole topology. Superconducting electric motors suitable for use in azimuthing pod 12 are described, for example, in U.S. Pat. No. 6,489,701 and U.S. Pat. No. 6,597,082, both of which are incorporated herein by reference. The HTS windings are required to be cryogenically cooled to temperatures about 108° K. The overall size of the azimuthing pod 12 can be minimized by limiting the number of components within the pod.

For example, as shown in the embodiment of FIG. 1, the turntable assembly 28 within the hull also supports the primary components of the cryogenic system for cooling the HTS windings. Cryogenic cooling systems suitable for use in cooling the HTS windings of superconducting electric motor 18 are described in U.S. Pat. No. 6,347,522 and U.S. Pat. No. 6,376,943, both of which are incorporated herein by reference. In particular, turntable assembly 28 supports an HTS refrigeration module 34 and its associated compressor 36, which is connected to refrigeration module 34 via a pressurized gas line 38. Pressurized gas line is flexible, are 30 mm in diameter, have a minimum bend radius of 100 mm and can easily be run over lengths up to 20 meters.

Figure 2:
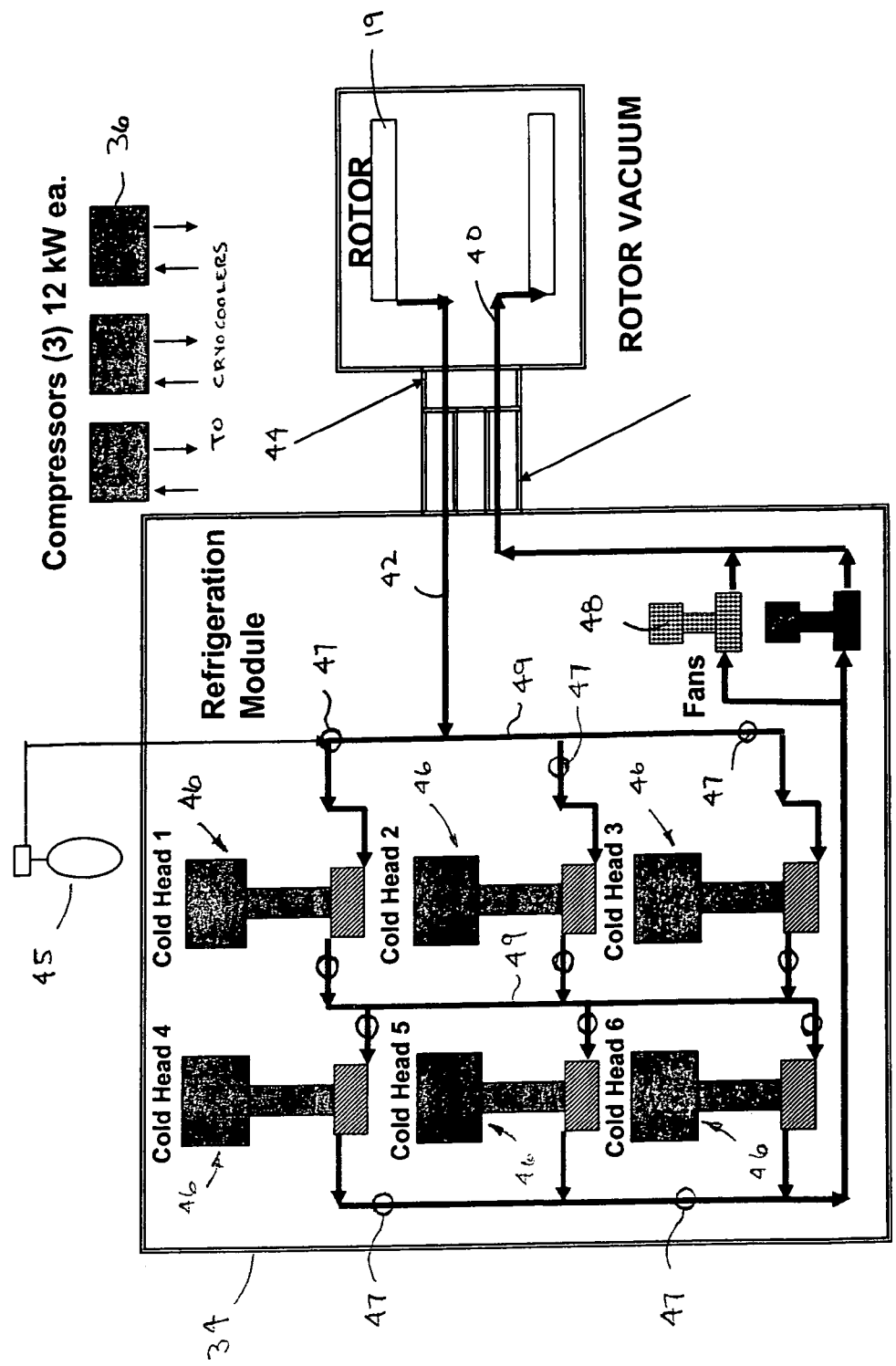
FIG. 2 is a block diagram of the cooling system of FIG. 1.

Referring to FIG. 2, refrigerant from HTS refrigeration module 34 is circulated through rotor assembly 19 through a supply transfer line 40 and return transfer line 42. Supply transfer line 40 and return transfer line 42 are in the form of vacuum insulated lines. In one configuration, the transfer lines are formed as concentric streams in vacuum jacketed plumbing. The diameter of the vacuum jacket for this configuration is approximately 4 inches and can assume a bend radius of 6 inches. In an alternate configuration, the insulated cold gas inner supply and return lines are independent from each other, 0.75 inches in diameter and run in parallel inside the vacuum jacket. For separate streams the vacuum jacket diameter would be 2 inches and the bend radius would be 4 inches. These separate lines are lighter and can be easier to install than a larger single line. The refrigerant is supplied and returned to rotor assembly 19 through a transfer coupling 44 for interfacing the stationary reference frame of the hull to the rotating reference frame of the azimuthing pod 12. Details relating to the structure of transfer coupling 44 can be found in U.S. Pat. No. 6,489,701. Other approaches for interfacing a stationary reference frame to a rotating reference frame are described in U.S. Pat. No. 6,347,522 and U.S. Pat. No. 6,376,943.

In this embodiment, the cryogenic fluid is helium and, therefore, cooling system 10 includes a source 45 of helium, which, if necessary, may be required to replenish helium to the system. Preferentially, the cryogen circulates through the cooling system in a gaseous state. HTS refrigeration module 34 may be in the form of any of a wide variety of configurations including perforated plate or coiled tube heat exchangers.

In this embodiment, HTS refrigeration module 34 includes six cryocoolers 46, each of which may be any of a wide variety of cryocooling refrigerators designed to operate according to one of several thermodynamic cycles including Gifford-McMahon, Stirling and pulse-tube cycle, such as those described in U.S. Pat. No. 5,482,919, which is incorporated herein by reference. Each cryocooler 46 is associated with a compressor 36, however, in other embodiments, a single compressor may be used with the multiple cryocoolers. Each cryocooler provides a cryogenically cooled surface for cooling the helium. One example of a cryocooler appropriate for use in HTS refrigeration module 34 is Model No. RGS 120-T, manufactured by Leybold, Inc., Cologne, Germany.

Cryocoolers 46 are connected in a series arrangement through conduit lines 49 that include valves 47 to allow each cryocooler to be isolated from remaining ones of the cryocoolers while allowing continued operation of the system. In particular, bypass conduits (not shown) for each cryocooler 46 are used to allow continued flow of the cryogenic fluid so that the isolated cryocooler can be, for example, repaired or replaced. Valves 47 may be any of a wide variety of valves capable of operating at cryogenic temperatures including control or solenoidal valves. Valcor Scientific, Inc., Springfield, N.J. provides valves (e.g., on/off type) which are appropriate for use as valve 47.

HTS refrigeration module 34 also includes, in this embodiment, a pair of redundant high-speed (10,000-30,000 rpm) fans 48 disposed within the HTS refrigeration module 34 for circulating the helium through the cooling system. In essence, fans 48 serve as a mechanical mechanism positioned within the cryogenic environment for providing the necessary force to move the helium past cryocoolers 46 and on to rotor assembly 19. With that in mind, other mechanical devices capable of supplying such forces and operating in a cryogenic environment including diaphragms, piston-operated devices or blowers can serve as fluid transfer device(s). Thus, unlike many conventional cooling arrangements the helium (or other cryogenic fluid) need not undergo a phase change to be re-cooled after being heated by the load. As was the case with the multiple cryocoolers 46, a pair of fans 48 is used to provide redundancy and facilitate maintenance in the event that one of the fans requires maintenance or replacement. Of course, appropriate valve and bypass conduits are required to allow each of fans 48 to be isolated from the other while allowing continuous operation of the system. A fan determined well-suited for operation in a cryogenic environment is a Model A20 fan, available from Stirling Cryogenics and Refrigeration BV, The Netherlands.

Because the HTS refrigeration module 34 and associated compressor 36 are both supported by turntable assembly 28, these components of the system are advantageously part of the rotatable reference frame and rotate with the turntable assembly. Thus, as shown in FIG. 1, a conduit line 40, 42 between the refrigeration module 34 and transfer coupling 44 of the superconducting motor 18 can be introduced at almost any point between the pod seating and azimuthing pod 12. More particularly, conduit line 40, 42 need not be introduced into the azimuthing pod 12 along the axis of rotation 52 about which turntable assembly 28 rotates. This feature is particularly advantageous because much of the electrical wiring and lubrication lines (e.g., bearing lubrication) required between power transmission/control system 32 lies along axis of rotation 52. Moreover, because refrigeration module 34 and compressor 36 are mounted within hull 14, access to these components of the pod propulsion system 10 is easier, for example, for maintenance purposes.

In certain other embodiments, space on the turntable assembly 28 or around pod seating 16 may be limited. In other embodiments, components of the cooling system may necessarily be positioned at an area of the ship remote from pod, seating 16. In such embodiments, it may be necessary to move one or more of the components of the cryogenic cooling system off of turntable assembly 28.

Figure 3:
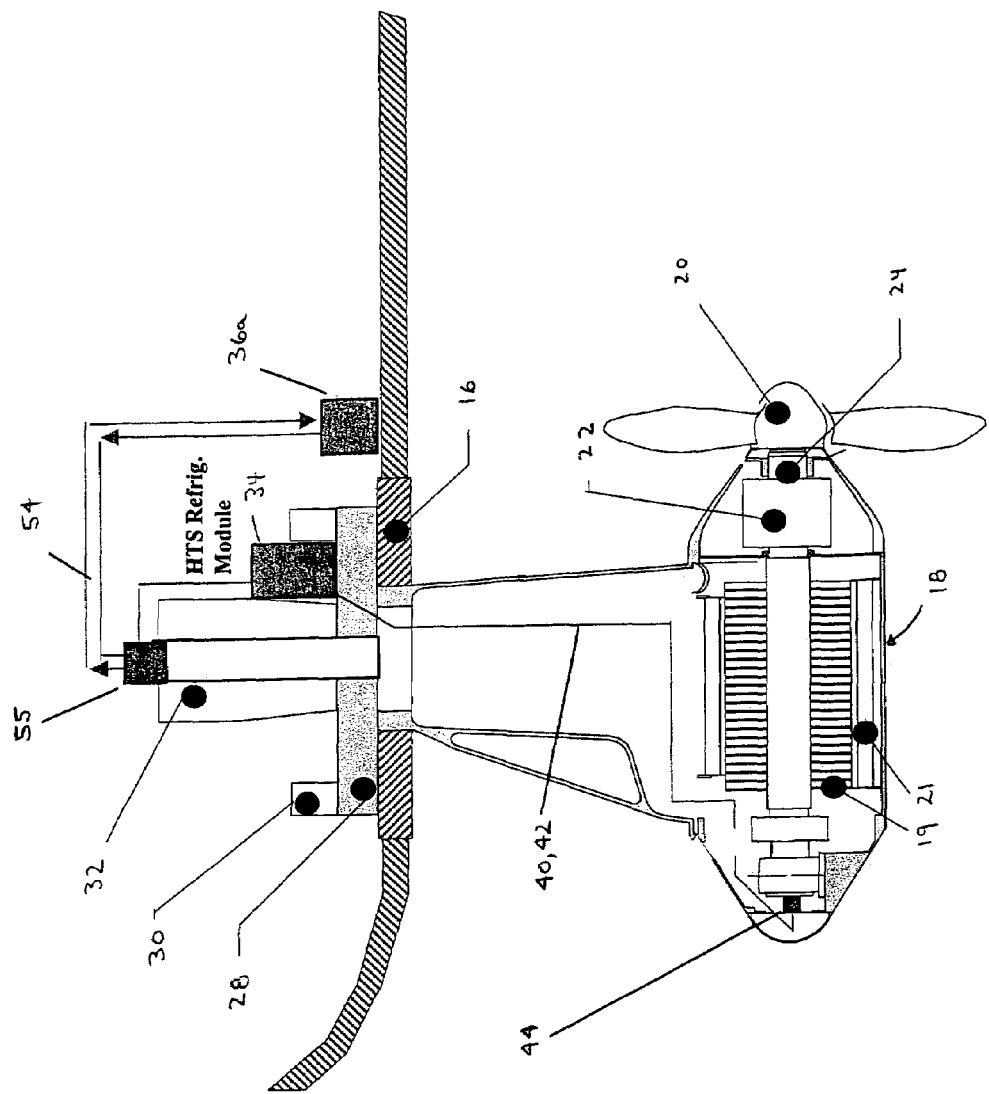
FIG. 3 is an alternative embodiment of an azimuthing pod including a cryogenic cooling system.

For example, referring to FIG. 3, while refrigeration module 34 is mounted on turntable assembly 28 and, therefore, rotates with the turntable assembly, a compressor 36a is mounted off the turntable assembly. Gas lines 54, at ambient temperatures, couple HTS refrigeration module 34 with compressor 36a through a transfer coupling 55 including a gas seal assembly. Transfer coupling 55 is mounted along axis of rotation 52 and includes a standard gas seal with O-rings. Transfer coupling 55 is at ambient temperature and transfers the ambient temperature high pressure gas between the stationary reference on the hull side of pod seating 16 and the rotating reference frame of the azimuthing pod 12. Like the embodiment discussed above in conjunction with FIG. 1, the conduit line 40, 42 between HTS refrigeration module 34 and superconducting motor 18 need not be introduced into the azimuthing pod 12 along an axis of rotation 52 about which turntable assembly 28 rotates.

Figure 4:
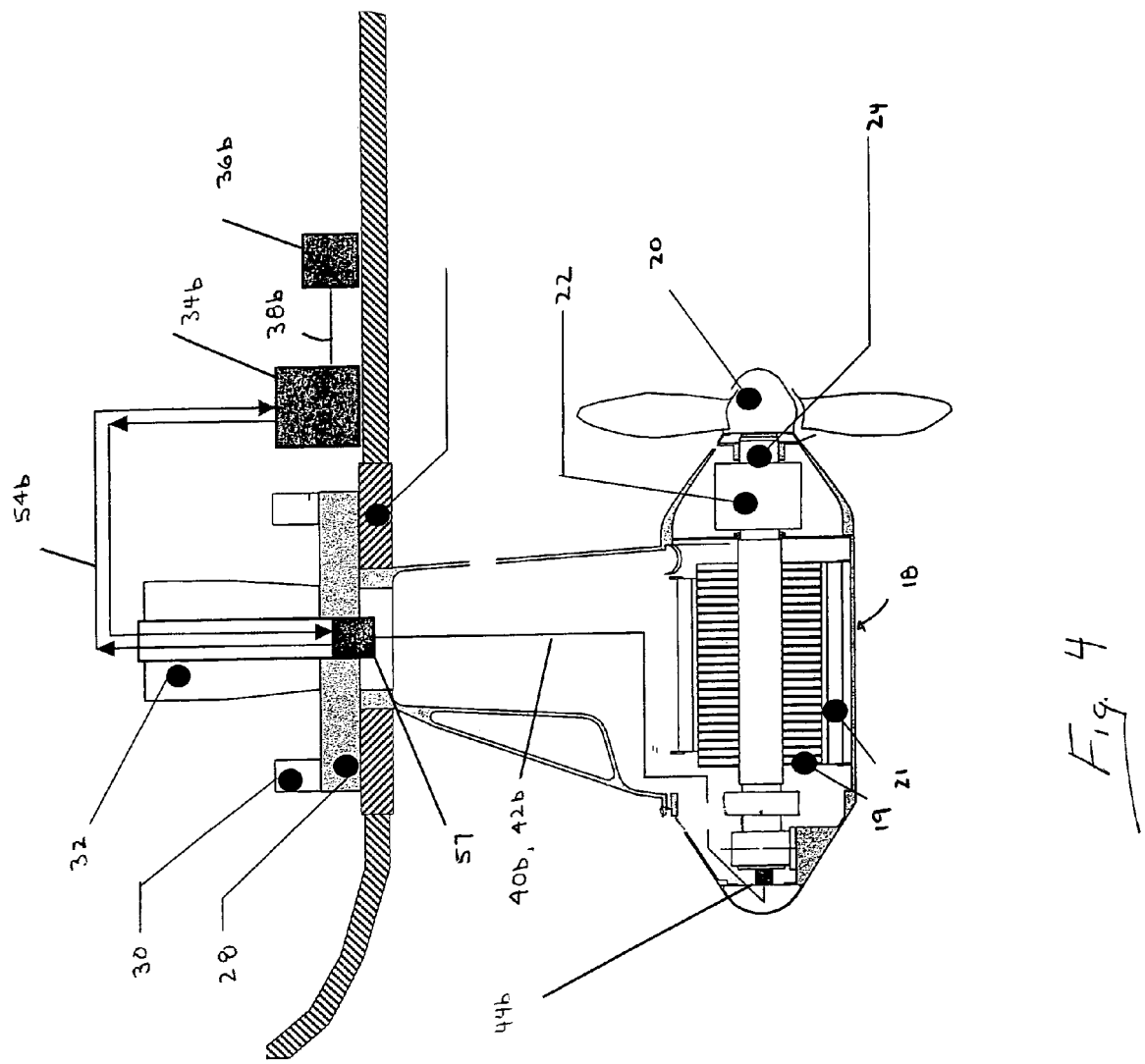
FIG. 4 is a further embodiment of an azimuthing pod including a cryogenic cooling system.
Figure 5:
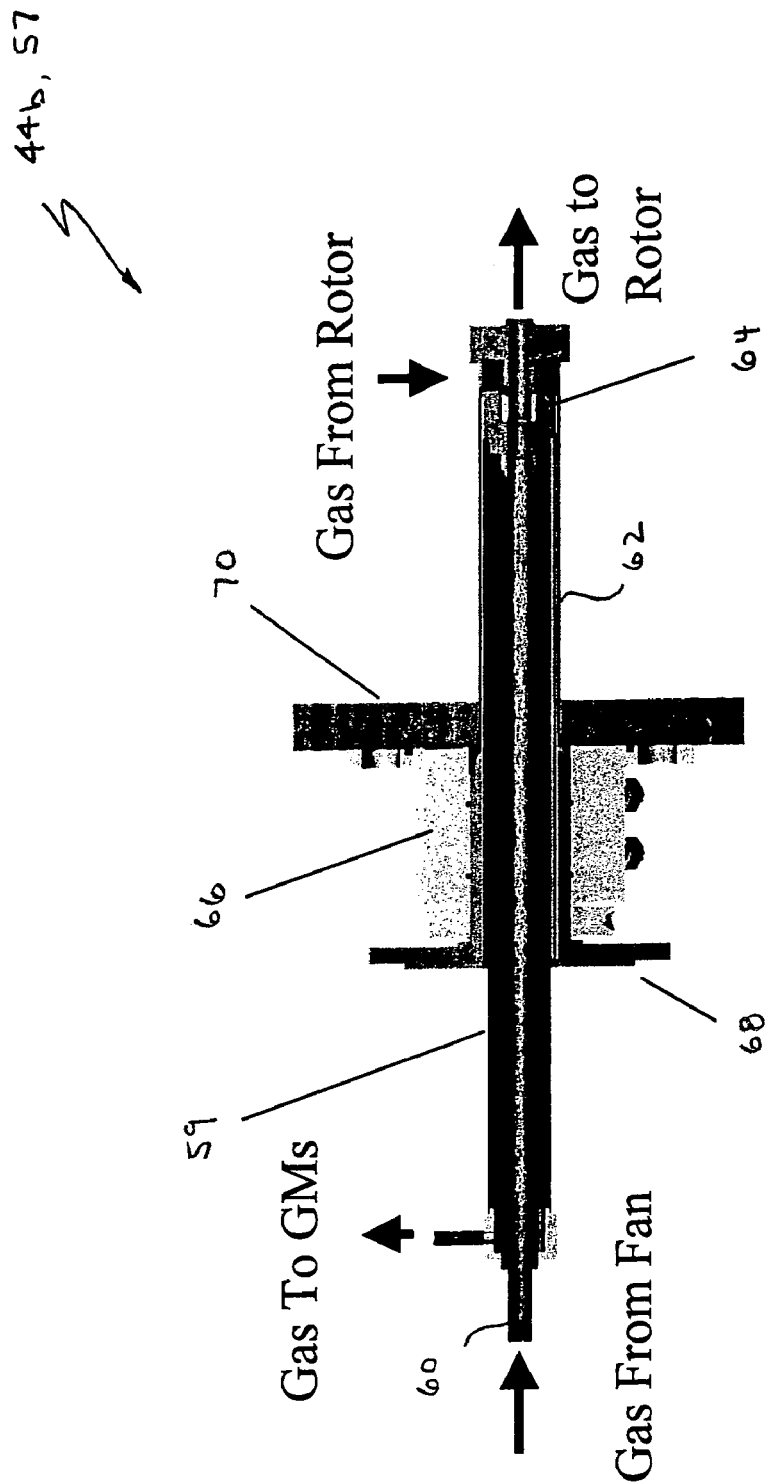
FIG. 5 is a cross-sectional side view of a transfer coupling used in conjunction with the cryogenic cooling systems of FIGS. 3 and 4.

Similarly, as shown in FIG. 4, where space on turntable assembly 28 is further limited, a refrigeration module 34b and compressor 36b are not supported by turntable assembly 28. Thus, unlike the embodiment of FIG. 3, because both refrigeration module 34b and compressor 36b are not supported by turntable assembly 28, a conduit line 38b, like that used in the embodiment of FIG. 1, is used to couple the two components of the cryogenic cooling system. This topology requires a cooling conduit 54b between refrigeration module 34b and a transfer coupling 57 mounted at the interface between turntable assembly 28 and pod seating 16. Furthermore, supply and return transfer lines 40b, 42b connect transfer coupling 57 to transfer coupling 44b of superconducting motor 18. In this embodiment, the refrigeration module 34b and compressor 36b are not supported by turntable assembly 28 and therefore these components are stationary relative to the rotatable turntable assembly. To avoid winding of the cooling conduit 56 about the components mounted on the turntable assembly 28, transfer coupling 57 is located on the axis of rotation 52. Thus, this topology, unlike the embodiments of FIGS. 1 and 3, has the advantage of a smaller turntable assembly with the disadvantage of requiring use of the axis of rotation 52. Referring to FIG. 5, an example of a transfer coupling suitable for use as transfer couplings 44b, 57 in FIG. 4 is shown. The transfer coupling includes a bayonet connection 59 between the stationary reference and rotating reference frames. In particular, the bayonet connection 59 includes a center conduit 60 surrounded by a coaxial outer jacket 62. Center conduit 60 is supported within coaxial outer jacket 62 with a slip seal 64. The transfer coupling also includes a ferrofluidic seal 66 positioned between a stationary vacuum flange 68 and a rotor vacuum flange 70. Cryogenically-cooled gas from fans 48 is provided through center conduit 60 to the rotor assembly 19 and returned to the HTS refrigeration module 34, 34b along a path between center conduit and coaxial outer jacket 62.

Referring to FIG. 6, in a further embodiment, a HTS refrigeration module 34c is shown positioned with azimuthing pod 12 with the associated compressor 36c mounted on turntable assembly 28. Similar to the embodiment discussed above in conjunction with FIG. 1, a conduit line 40c, 42c extending between the stationary and rotating reference frames (i.e., between compressor 36c and refrigeration module 34c) need not be introduced into the azimuthing pod 12 along an axis of rotation 52 about which turntable assembly 28 rotates. A simple conduit 72 connects refrigeration module 34c and transfer coupling 44 of the superconducting motor 18. In this topology, space within azimuthing pod 12 is occupied by HTS refrigeration module 34c and access to it is more limited (e.g., for maintenance purposes). However, this topology advantageously, provides more space along the axis of rotation for other mechanical systems (e.g., bearing lubrication, etc.).

Other embodiments are within the scope of the claims.

What is claimed is:

1. A system for use with a ship having a hull, the system comprising:
    an azimuthing pod configured to be attached to the hull;
    a rotatable support member configured to interface a stationary reference frame in the hull to a rotating reference frame in the azimuthing pod;
    a superconducting motor positioned within the azimuthing pod;
    a refrigeration system including:
    a compressor;
    a cryogenic refrigeration module coupled to the compressor; and
    a transfer system configured to circulate a coolant between the cryogenic refrigeration module and the superconducting motor, the cryogenic refrigeration module and the compressor being positioned within the hull of the ship and at least one of the cryogenic refrigeration module and the compressor being positioned on the rotatable support member within the hull of the ship.

2. The system of claim 1 wherein both the compressor and cryogenic refrigeration module are in the hull, the transfer system including transfer lines extending through the rotatable support member and between the module and superconducting motor.

3. The system of claim 2 wherein the transfer lines extend through a center axis of the rotatable support member.

4. The system of claim 1 wherein the rotatable support member is configured to rotate without limit about an axis of rotation.

5. The system of claim 1 wherein the coolant is selected from a group consisting of helium, hydrogen, oxygen, nitrogen, argon, neon, and mixtures thereof.

6. The system of claim 1 wherein the superconducting motor includes high temperature superconducting windings.

7. The system of claim 1 wherein the rotatable reference frame is configured to rotate without limit about an axis of rotation.

8. A system comprising:
    a superconducting machine disposed in a rotatable reference frame;
    a refrigeration system including:
    a compressor positioned;
    a cryogenic refrigeration module coupled to the compressor; and
    a transfer system configured to circulate a coolant between the cryogenic refrigeration module and the superconducting machine, wherein at least one of the compressor and the cryogenic refrigeration module is positioned on the rotatable reference frame.

9. The system of claim 8 further comprising a housing in the rotatable reference frame for enclosing the superconducting machine.

10. The system of claim 8 wherein the rotatable reference frame has an axis about which the superconducting machine rotates and the superconducting machine includes a rotor assembly which, in operation, rotates about an axis of the superconducting machine that is substantially perpendicular to the axis of the rotatable reference frame.

* * * * *